US011982404B2

(12) United States Patent
Kondogiani

(10) Patent No.: US 11,982,404 B2
(45) Date of Patent: May 14, 2024

(54) BEARING SYSTEM FOR CONFORMABLE TANKS

(71) Applicant: Noble Gas Systems, Inc., Novi, MI (US)

(72) Inventor: Christopher T. Kondogiani, Novi, MI (US)

(73) Assignee: Noble Gas Systems, Inc., Novi, MI (US)

( * ) Notice: Subject to any disclaimer, the term of this patent is extended or adjusted under 35 U.S.C. 154(b) by 28 days.

(21) Appl. No.: 17/513,479

(22) Filed: Oct. 28, 2021

(65) Prior Publication Data

US 2022/0136651 A1 May 5, 2022

Related U.S. Application Data

(60) Provisional application No. 63/106,948, filed on Oct. 29, 2020.

(51) Int. Cl.
*F17C 1/00* (2006.01)

(52) U.S. Cl.
CPC ...... *F17C 1/005* (2013.01); *F17C 2205/0192* (2013.01); *F17C 2205/0323* (2013.01)

(58) Field of Classification Search
CPC .............. F17C 1/005; F17C 2205/0323; F17C 13/084; F17C 2201/0138; F17C 2201/0147; F17C 2223/0123; F17C 2223/035; F17C 1/00; F17C 2205/0192; F17C 13/08; F17C 13/083; F17C 2205/0149; F17C 2205/0153; F17C 2205/0196; F17C 2205/0168; F17C 2205/0134; F17C 2205/013; F17C 2203/0609
USPC .......................................................... 220/592
See application file for complete search history.

(56) References Cited

U.S. PATENT DOCUMENTS

| | | | | | |
|---|---|---|---|---|---|
| 5,385,026 | A * | 1/1995 | Zhang | F17C 13/083 62/50.7 |
| 2017/0157837 | A1* | 6/2017 | Wexler | B29C 63/105 |
| 2018/0283610 | A1* | 10/2018 | Wexler | F17C 1/16 |
| 2021/0388948 | A1* | 12/2021 | Fujii | B60K 15/07 |

FOREIGN PATENT DOCUMENTS

| | | | | |
|---|---|---|---|---|
| CA | 2636100 A1 * | 12/2009 | F17C 13/082 |
| CN | 210891024 U * | 6/2020 | F17C 1/12 |
| DE | 102018204806 A1 * | 7/2019 | |
| KR | 101745269 B1 * | 6/2017 | |
| RU | 2304553 C1 | 8/2007 | |
| RU | 2355942 C1 | 5/2009 | |

(Continued)

OTHER PUBLICATIONS

International Search Report and Written Opinion for International Application No. PCT/US2021/057068 dated Feb. 3, 2022.

*Primary Examiner* — John K Fristoe, Jr.
*Assistant Examiner* — Laura E. Parker
(74) *Attorney, Agent, or Firm* — Young Basile Hanlon & MacFarlane, P.C.

(57) ABSTRACT

A pressure vessel includes an outer shell and pressurized elements disposed within the outer shell that contains a pressurized gas. The pressure vessel includes a bearing system disposed between the pressurized elements and the outer shell, and the bearing system allows controlled movement of the pressurized elements in respect to the outer shell.

19 Claims, 8 Drawing Sheets

(56) References Cited

FOREIGN PATENT DOCUMENTS

| | | | |
|---|---|---|---|
| WO | 96/23721 | A1 | 8/1996 |
| WO | 2003/016777 | A1 | 2/2003 |
| WO | 2010/072400 | A1 | 7/2010 |

* cited by examiner

BEARING SYSTEM FOR CONFORMABLE TANKS

CROSS-REFERENCE TO RELATED APPLICATIONS

This application claims benefit of and priority to U.S. Provisional Application 63/106,948 filed on Oct. 29, 2020, which is incorporated herein by reference in its entirety.

TECHNICAL FIELD

The present disclosure relates generally to a pressure vessel, and specifically, to a pressure vessel that includes expandable bearing systems.

BACKGROUND

When in use, storage tanks and/or pressure vessels that are used to store and supply high pressure gas expand with pressure changes and under changing environmental conditions. Particularly, storage tanks that utilize lightweight materials expand a significant amount, which can cause the mounting process to be difficult and could compromise the structural integrity of the storage tanks while the storage tanks are being mounted.

Typical storage tanks have a radial dimension that is less than the axial dimension. In light of these dimensional differences, the corresponding axial expansion and contraction is larger than the radial expansion and contraction.

In many systems, storage tanks are used in conjunction with other components that can generate and/or transmit significant vibration during use. Some storage tanks are mounted in a manner to avoid interference with these other components, though this solution uses increased packaging space. In other examples, mounting mechanisms for storage tanks can be designed to maintain stable interfaces that do not fail due to vibration caused by components that are directly or indirectly connected to or associated with the storage tanks.

The need for a stable location for a mounting mechanism that can deflect or mitigate vibrations to reduce impact to storage tanks may require a more extensive mounting system that detracts from the efficiency of the storage system. For example, these mounting systems can be heavy and take up space, which affects the practicality of implementing the tank system into any mobile machine or vehicle.

Since the storage tanks are subject to axial expansion and other types of deflection, bearings can be used to hold the storage tanks in place within a mounting mechanism. The use of bearings allows the storage tank to be located without imparting additional loads (i.e., increased weight or pressure) onto the external surfaces of the storage tank. Specifically, an expanding storage tank held by a rigid mounting structure would be subject to an increased stress level on and in the storage tank and the mounting structure, requiring each of these components to be stronger than if the storage tank expanded against a bearing-based mounting structure. Unfortunately, increasing the amount of external material on the outer surface to support additional external loads imparted by the mounting structure is not sufficient because light-weight storage tanks are typically built to be as light as possible.

Over time, bearing surfaces in a bearing-based mounting structure are exposed to external environments and can fail due to contamination or heat cycling. Contamination, heat cycling, or other external forces can compromise the functionality of the bearings and can cause forces to be imparted onto the storage tank and the mounting structure that limits the life of these components and potentially results in failure. In other words, failures in the bearings could result in a rupture or other failure of the storage tanks, and finally, a loss of the substances contained within the storage tanks, such as pressurized gases, fluids, or both.

Conformable storage tanks (i.e., storage tanks with multiple pressurized elements held inside a shell) are subject to similar environmental stress as traditional storage tanks. Mounting the conformable storage tanks by rigidly securing them within a shell is useful for providing lighter and less complicated systems. However, the pressurized elements within the conformable storage tank often are restrained from movement that could cause damage in the form of a piercing of the shell, an abrasion from contact against other pressurized elements within the conformable storage tanks, causing offensive noises, and/or a fatigue failure of the pressurized elements. The pressurized elements of within the conformable storage tanks also expand under increasing pressure, which can exacerbate the problems described herein.

SUMMARY

The disclosure relates to bearing systems used in a pressure vessel.

In a first aspect of the disclosure, the pressure vessel includes an outer shell and pressurized elements disposed within the outer shell that contains a pressurized gas. The pressure vessel includes a bearing system disposed between the pressurized elements and the outer shell, and the bearing system allows controlled movement of the pressurized elements in respect to the outer shell.

In the first aspect, the bearing system may include a bearing component with a rigid structure that is shaped to conform to an interior of the outer shell and to an exterior of the pressurized elements. The bearing system may include a bearing component that surrounds the pressurized elements to secure the pressurized elements together, and the bearing component may be formed from a material that reduces friction with the outer shell and the pressurized elements so that abrasive damage in the pressure vessel is minimized. The bearing system may include a bearing component formed from a flexible material, and the bearing component may bend to enable radial and axial expansion and contraction of the pressurized elements. The flexible material of the bearing component may include one or more of foam, plastic, gel, metal, or any combination thereof. The pressurized elements may each be connected to another of the pressurized elements so that each of the pressurized element is in fluid communication with at least one other of the pressurized elements. The pressure vessel may further include end fittings positioned on terminal ends of two of the pressurized elements and valves connected with the pressurized elements so that a pressurized gas source is connectable with pressurized elements. The outer shell may include valves in fluid communication with the pressurized elements and configured to facilitate the flow of pressurized gas between the pressurized elements and an external environment. The bearing system, the shell, or both may be made of plastic, aluminum, carbon fiber, or a combination thereof. The outer shell may have an interior surface that is smooth so that friction is mitigated when the pressurized elements contact or slide against the interior surface of the outer shell and/or pressurized elements. The first aspect may include any combination of the features described in this paragraph.

In a second aspect of the disclosure, a pressure vessel includes an outer shell and pressurized elements disposed within the outer shell that contains a pressurized gas. The pressure vessel includes a bearing system disposed between the pressurized elements and the outer shell. The bearing system allows controlled movement of the pressurized elements in respect to the outer shell and reduces localized stress in the pressurized elements during movement of the pressurized elements to a stress value below a stress threshold. Additionally, the bearing system dampens the vibrational input that transfers from the shell to the pressurized elements from external mounting sources.

In a third aspect of the disclosure, a pressure vessel includes pressurized elements that contain a pressurized gas and a shell enclosing the pressurized elements. The shell allows the pressurized elements to move in respect to the shell in an axial direction and a radial direction. The pressure vessel includes a bearing system secured the pressurized elements within the shell. The bearing system includes a bearing component formed of a rigid structure coupled to an interior surface of the shell and shaped to abut exterior surfaces of the pressurized elements so that the pressurized elements are controlled to expand and contract in an axial direction and a radial direction.

In the third aspect, the bearing component may include ribs formed of a rigid structure coupled to an exterior of the pressurized elements, and the ribs may control expansion of the pressurized elements secured by the bearing system. The ribs may have a web-like structure that has a stiffness in the axial direction that is more than a stiffness in the radial direction. The ribs may have a structure of a lattice configured to control the expansion and contraction of the pressurized elements in an axial direction. The bearing system may include rounded edges that are configured to reduce localized and/or uneven stress on the pressurized elements. The third aspect may include any combination of the features described in this paragraph.

In a fourth aspect of this disclosure, a pressure vessel includes an outer shell and pressurized elements disposed within the outer shell and configured to contain a pressurized gas. The pressure vessel includes a bearing system disposed between the pressurized elements and the outer shell. The bearing system allows movement of the pressurized elements in respect to the outer shell and reduces localized stress in the pressurized elements during movement of the pressurized elements to a stress value below a stress threshold.

In the fourth aspect, the bearing system may have a sliding configuration so that the bearing system is configured to slide and hold the pressurized elements in place. The bearing system may include bearing components having rounded edges, and the rounded edges may reduce localized stress in the pressurized elements by increasing a contact area between the bearing components and the pressurized elements. The outer shell may include a rigid constraint on one or more surfaces of the shell. The bearing system may have a bonded configuration in respect to the pressurized elements so that abrasion between the bearing system, the pressurized elements, the outer shell, or any combination thereof is mitigated. The fourth aspect may include any combination of the features described in this paragraph.

DETAILED DESCRIPTION

Figure 1:
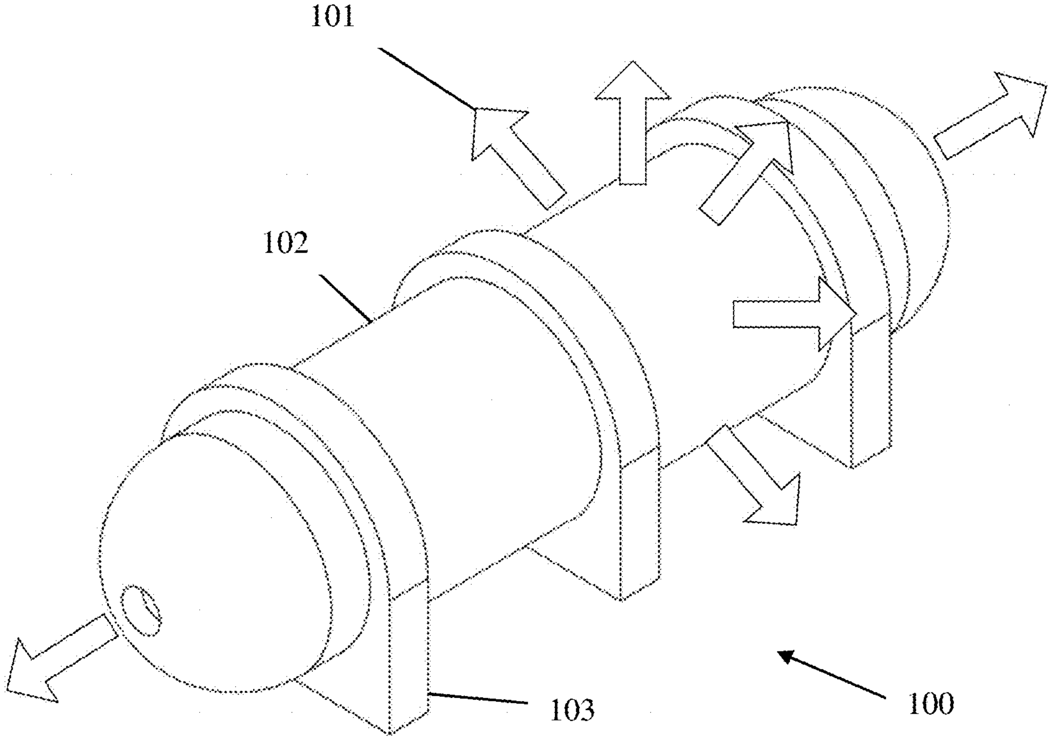
FIG. 1 is a perspective view of a pressure vessel.

Bearing systems for pressurized elements are disclosed. One bearing system is contained inside of a shell of a pressure vessel that provides the structure and flexibility required to restrain the pressurized elements while protecting the pressurized elements and the components of the bearing system from environmental contaminants, such as vibrations, heat, friction, deflections, or similar material altering factors. Additionally, a purposeful approach to the design of the shell and the bearing system utilizes a simple and effective assembly of components with a reduced number of parts, the use of which leads to cost and weight optimization that further improves the durability of the pressure vessel.

Using a bearing system contained within the shell of the pressure vessel provides several advantages. First, the bearing system provides structural support for the pressurized elements, which prevents the pressurized elements from vibrating, sliding, and/or moving inside the shell. Second, the bearing system enables the pressurized elements to expand without changing the dimensions of the shell or subjecting the shell or the pressurized elements to undesirable forces. Third, the bearing system provides a convenient mechanism for the pressurized elements to be installed within the shell without adverse conditions, such as binding between the pressurized elements and the shell and with fewer dimensional control issues, that is, with fewer changes occurring to axial and radial dimensions of the pressurized elements, and thus, assembly or manufacturing of the bearing system and the pressurized elements is improved.

The bearing systems disclosed herein may be configured to manage the relative motion between the pressurized elements and a mounting structure while reducing or mitigating the forces exerted by expansion and contraction. In one example, the pressurized elements of a pressure vessel are contained by a rigid structure of a bearing system that restricts relative motion between the pressurized elements. For example, the rigid structure of the bearing system is shaped, molded, or both to enable radial expansion of the pressurized elements without negatively impacting other structural advantages of the pressurized elements. In another example, the rigid structure of the bearing system maintains the relative position of the pressurized elements and prevents a sliding motion of the pressurized elements relative to an interior surface of the shell, which allows a limited amount of radial movement that is caused by the expansion and the contraction of the pressurized elements. The material(s) on the interior of the shell and the rigid structure of the bearing system may be selected to reduce friction between the shell, the rigid structure, the pressurized elements, or any combination thereof. Use of a material with a lower amount of friction for the bearing system and reduces undesirable noises, prevents wear, and minimizes forces that are exerted onto the pressurized elements, the shell, or both.

FIG. 1 is a perspective view of a pressure vessel 100. The pressure vessel 100 will expand and contract axially and radially as shown by arrows 101 as the gas pressure inside changes during filling and operation. Three retaining straps 102 are shown as holding the pressure vessel 100 in place while allowing some axial dimensional changes. The retaining straps 102 are connected to a surface, a vehicle, or another structure with a mounting structure 103. The mounting structure 103 provides a rigid and permanent connection to, for example, the vehicle. The components of the mounting structure 103 may be heavy and take up additional volume or packaging space, which leads to lower operating efficiency of the vehicle. For many vehicle-based or other mobile applications, excess weight and space taken up by the mounting structure 103 and the retaining straps 102 can lead to a reduction in the amount of gas that can be stored in the vehicle. In addition, the retaining straps 102 are exposed to environmental conditions, such as temperature changes, moisture, and dust, that can degrade the performance of the retaining straps 102 or cause premature failure of the pressure vessel 100. In other words, the pressure vessel 100 used in this configuration can rupture more easily and undesirably release gas when the retaining straps 102 are degraded.

Figure 2:
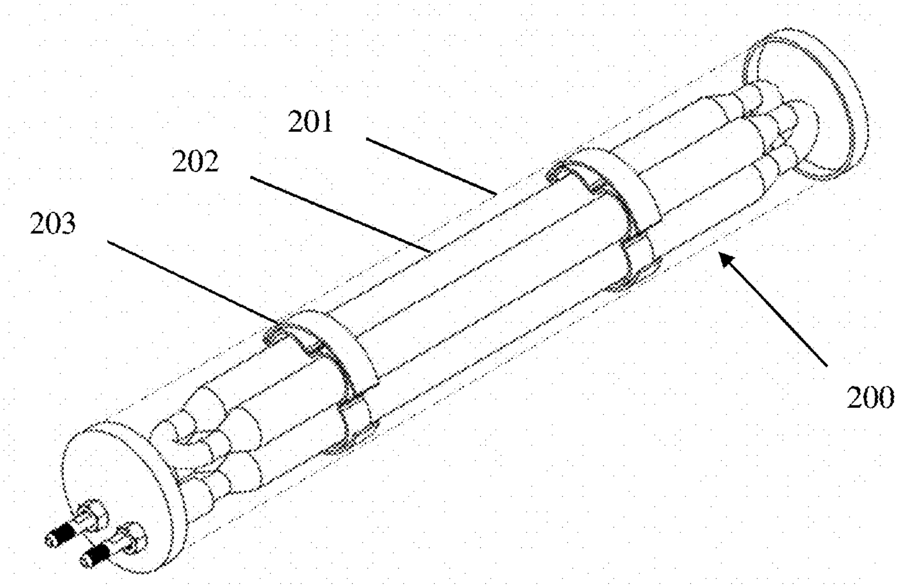
FIG. 2 is a perspective view of another pressure vessel with a shell that is shown as transparent.

FIG. 2 is a perspective view of another pressure vessel 200 with a shell 201 that is shown as transparent. The pressure vessel 200 includes multiple pressurized elements 202, only one of which is marked. A bearing system 203 holds the pressurized elements 202 of the pressure vessel 200 in place while allowing some expansion and contraction of the pressurized elements 202 radially. If low friction exists between the bearing system 203 and the pressurized element 202, the pressurized elements 202 may be axially expandable along the bearing system 203, which leads to less uneven pressure against the walls of the pressurized elements 202. The shell 201 protects, encases, encloses, or surrounds the pressurized elements 202 and the bearing system 203 so that environmental hazards are mitigated or prevented from entering the pressure vessel 200 or contacting the bearing system 203. Environmental hazards can include, but are not limited to dust, moisture, and caustic fluids.

Because the pressurized elements 202 and the bearing system 203 are protected by the shell 201, the bearing system 203 can be made of lighter weight materials, such as plastic, aluminum, or carbon fiber, allowing a lower weight and small size when compared to other pressure vessels and bearing systems, such as the pressure vessel 100, the bearings 102, and the mounting structure 103 of FIG. 1. Further, the materials of the bearing system 203 or the shell 201 may be complementary to the shell 201 so that friction or abrasion damage is reduced when the pressurized elements 202 or the bearing system 203 contact the shell 201. In some vehicle applications, the shell 201 may directly connect to the vehicle by fasteners of any sort, and this simpler connection or configuration can be advantageous because the lighter structure allows for more parts or items to be placed on the frame of the vehicle, within the shell 201, or adjacent or proximate to the pressure vessel 200.

Figure 3:
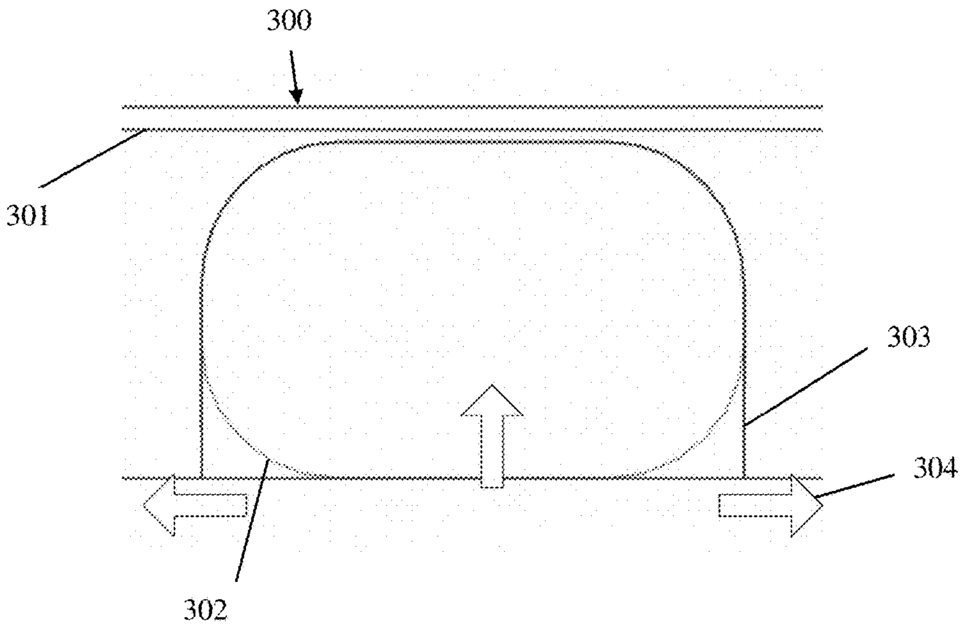
FIG. 3 is a front, partial cross-sectional view of another pressure vessel that has a rounded interface with a shell.

FIG. 3 is a front, partial cross-sectional front view of another pressure vessel 300 that has a rounded interface with a shell 301. The pressure vessel 300 includes the shell 301, pressurized elements 302, only one of which is shown, and a bearing system 303. The bearing system 303 is rigid and has a rounded shape where the bearing system 303 contacts the shell 301 to reduce friction between the shell 301 and the bearing system 303 and to prevent binding of the pressurized elements 302 to the shell 301, for example, in conditions of prolonged expansion. In a similar manner to the bearing system 203 of FIG. 2, the bearing system 303 of FIG. 3 restricts some of the pressurized elements 302 from moving or sliding against the other pressurized elements 302 while allowing expansion and contraction of each pressurized element 302 by way of allowing the pressurized elements 302 to slide against the smooth surface of interior of the shell 301, the pressurized elements 302, or other structural components (not shown) inside the pressure vessel 300. The shape and material used for the bearing system 303 are selected and designed to reduce friction and abrasion damage and to prevent binding as the pressurized elements 302 expand and contract. The expansion or contraction of the pressurized elements 302 is shown by arrows 304. In some implementations, the bearing system 303 may have a structure that is sufficient to create low friction between the bearing system 303 and the pressurized elements 302. For example, the bearing system 303 may have a structure that is rounded, chamfered, toroidal, cornered, square, or any combination thereof.

The bearing system 303 may enhance an assembly process of the pressure vessel 300 by allowing the pressurized elements 302 to be more easily inserted into the shell 301. For example, the bearing system 303 may include components that are capable of coupling and decoupling from the pressurized elements 302 so that the pressurized elements 302 are replaceable in the pressure vessel 300. Similar to other configurations described herein, the bearing system 303 may have components with a rounded shape to prevent binding during the installation process and to allow the pressurized elements 302 to be sub-assembled outside the shell 301 and inserted later, which can be more convenient than assembling the pressurized elements 302 into a desired configuration inside the shell 301.

Figure 4A:
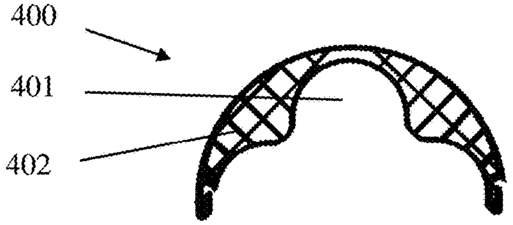
FIG. 4A is a front, partial cross-sectional view of a bearing system for another pressure vessel.

FIG. 4A is a front, partial cross-sectional view of a bearing system 400 for another pressure vessel, such as the pressure vessels 200, 300 of FIGS. 2 and 3. In this example, the bearing system 400 is constructed of stiff or rigid materials, such as plastic or metal, so that the bearing system 400 can hold pressurized elements, such as the pressurized elements 202 and 302 of FIGS. 2 and 3, in a secure position, for example, within a shell, such as the shell 201 of FIG. 2. The pressurized elements are held together and/or held in place within defined spaces 401 in the bearing system 400 by bearing components, such as ribs 402. In this example, the bearing system 400 includes the ribs 402 with a rigid structure that are coupled to the exterior of the pressurized elements so that expansion of the pressurized elements secured by the bearing system 400 is controlled. For example, the ribs 402 are flexible in the radial direction, acting as a spring to keep the bearing system 400 in contact with a surface of the rib 402 without being rigid. The rib 402 can have a web-like structure or act as a leaf spring that has a high stiffness in the axial direction and a relatively lower stiffness in the radial direction. The rib 402 can be tuned to provide support for the pressure forces of the bearing system 400 on the pressurized elements as an additional benefit. The bearing system 400 can also be designed to mitigate vibration through material choice and design of the rib 402.

Figure 4B:
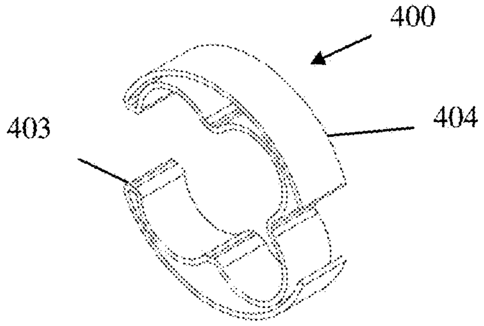
FIG. 4B is a perspective view of a bearing system for another pressure vessel.

FIG. 4B is a perspective view of the bearing system 400 for a pressure vessel, such as the pressure vessels 200, 300 of FIGS. 2 and 3. In some examples, the bearing system 400 includes a bearing element 403 that has flexible spring-like features 404 holding the bearing element 403 in a secure position, for example, within a shell, such as the shell 201 of FIG. 2.

Separately or in combination with the ribs 402, the bearing system 400 may include one or more other bearing components (not shown) that are like the ribs 402 in that they are formed from rigid structures. The other bearing component(s) may conform to an interior of a shell, such as the shells 201, 301 of FIGS. 2 and 3, and an exterior of a pressurized element, such as the pressurized elements 202, 302 of FIGS. 2 and 3, so that abrasion or friction damage to the pressurized elements is further managed, minimized, or mitigated. As an example, where a material that reduces friction or abrasion with an interior of the shell and the exterior of the pressurized elements is used for the other bearing component(s), the other bearing component(s) may surround the pressurized elements to secure the pressurized elements together so that abrasive damage in the pressure vessel is minimized. In another example, the other bearing component(s) may be formed from a rigid structure, such as a lattice of rib structures, and may be coupled to the interior surface of the shell and shaped to abut exterior surfaces of the pressurized elements so that the expansion and contraction of the pressurized elements is controlled in at least an axial direction.

Figure 5:
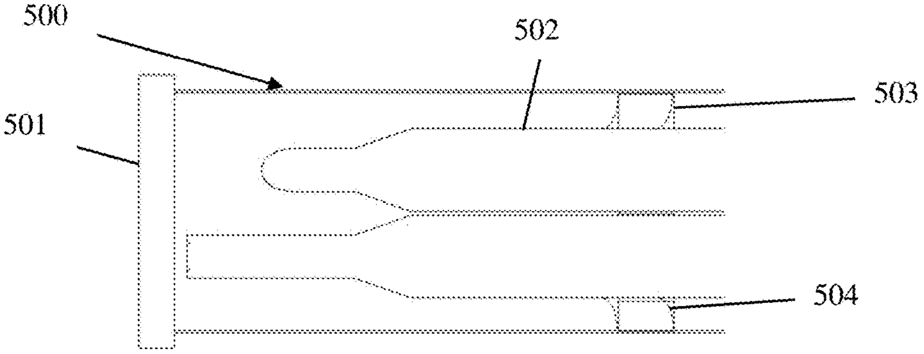
FIG. 5 is side, sectional view of another pressure vessel with a shell that is shown as transparent.

FIG. 5 is a partial side view of another pressure vessel 500 with a shell 501 that is shown as transparent. The pressure vessel 500 includes pressurized elements 502. The pressure vessel 500 also includes a bearing system 503 that allows for both radial and axial expansion and contraction of the pressurized elements 502 by including flexible components 504. The flexible components 504 are shown by a dotted line in a flexed position to indicate a possible position for the flexible components 504. The flexible components 504 of the bearing system 503 in this example are both bendable and able to secure and hold the pressurized elements 502 in place within the shell 501. For example, the flexible component 504 or another bearing component may be formed from a flexible material so that the flexible component 504 bends to enable radial and axial expansion and contraction of the pressurized elements 502. In another example, when the pressure vessel 500 experiences changes in gas volume within the pressurized elements 502 or within the shell 501, the flexible components 504 permit the pressurized elements 502 to expand or contract by bending without breaking, both axially and radially.

The flexible components 504 can be made of plastic, foam, gel, metal, or any combination thereof that is shaped or configured so that the flexible components 504 have low stiffness or moment of inertia in the axial direction of the pressurized elements 502. In other words, the flexible components 504 can allow for some movement in the axial direction of the pressurized elements 502. In some examples, one of the benefits of the flexible components 504 is that radial expansion is improved due to compression of the flexible components 504 as the pressurized elements 502 are filled with compressed gas. Additional benefits of the flexible components 504 include an improved manufacturing tolerance, reduced cutting, reduced abrasion of the reinforcement due to the interface with the bearing, lower weight, increased vibration resistance, and improved shock dampening.

Figure 6:
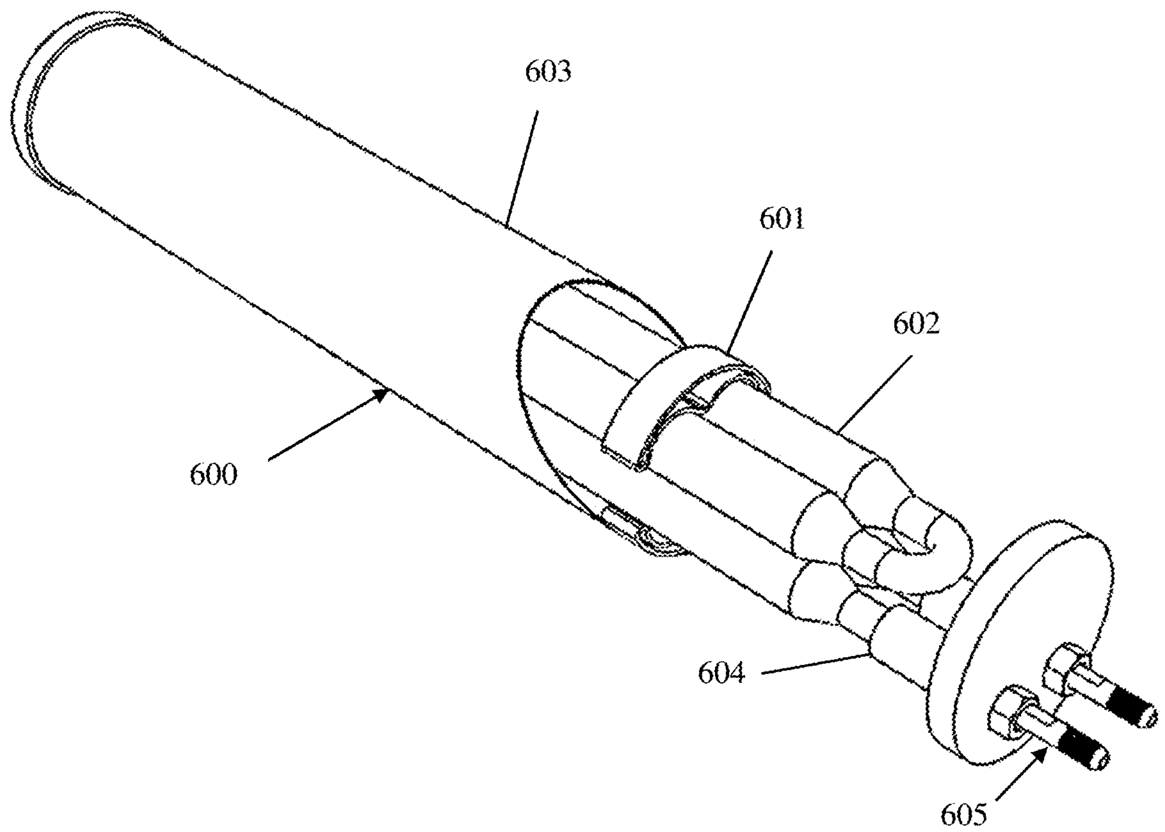
FIG. 6 is a cutaway perspective view of another pressure vessel.

FIG. 6 is a cutaway perspective view of another pressure vessel 600. The pressure vessel 600 includes a bearing 601 that secure pressurized elements 602 so that the pressurized elements 602 are prevented from rubbing against an internal surface of a shell 603. Under the shell 603, between two and five bearing 601 may be secured to the pressurized elements 602 so that the pressurized elements 602 do not move radially against or in respect to the shell 603. The bearing 601 may have a fixed or sliding connection with the pressurized elements 602 depending on the desired pressure distribution among the bearing 601 and the pressurized elements 602.

Additionally, the pressure vessel 600 may include end fittings 604 between the pressurized elements 602 and valves 605 for facilitating gas or fluids. The valves 605 are positioned on one end of the pressure vessel 600 for easy assembly with a gas or fluid source (not shown) that facilitates movement of gas or fluids. In some examples, the valves 605 may be positioned on both sides of the pressure vessel 600 to accommodate different configurations and connection mechanisms of gas or fluid sources (not shown). The bearing 601 may further prevent axial movement of the pressurized elements 602 by sliding along the pressurized elements 602 and keeping the pressurized elements 602 in a fixed position.

EXAMPLES

The following Examples 1-4 are presented as analyses of structural integrity of various types of pressurized elements using a finite element test (FET) of comparative modeling. The purpose of these Examples is to illustrate the benefits of varying bearing configurations that could be used in the pressure vessels 100, 200, 300, 500, 600 described in respect to FIGS. 1, 2, 3, 5, and 6.

Figure 7:
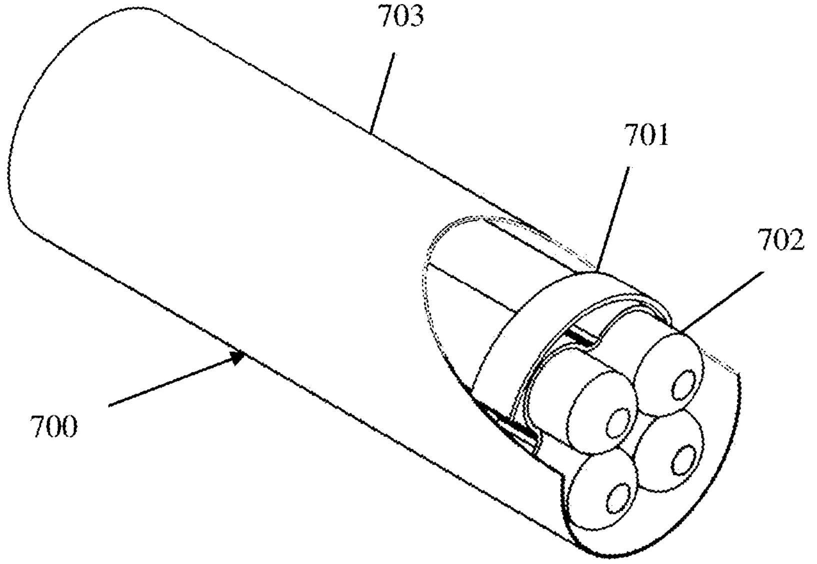
FIG. 7 is a cutaway perspective view of another pressure vessel used for a finite element test (FET).

FIG. 7 is a cutaway perspective view of another pressure vessel 700 used for a FET. The pressure vessel 700 has a bearing 701 having a cylindrical shape. The bearing 701 wraps around pressurized elements 702 and is surrounded by a shell 703 having a cylindrical shape so that the shape of the shell 703 matches the shape of the bearing 701. More bearings (not shown) may be positioned beneath the shell 703 to provide extra securing mechanisms for the pressurized elements 702. The pressure vessel 700 is similar to the pressure vessel 600 of FIG. 6, but is shown without the end fitting 604 or the valves 605.

Examples 1-3 explore the benefits of different connections between the bearing 701 and the pressurized elements 702 and different configurations of the bearing 701. Example 4 shows different size and shape configurations of pressure vessels that have a similar function to the varying configurations of Examples 1-3.

Figure 8:
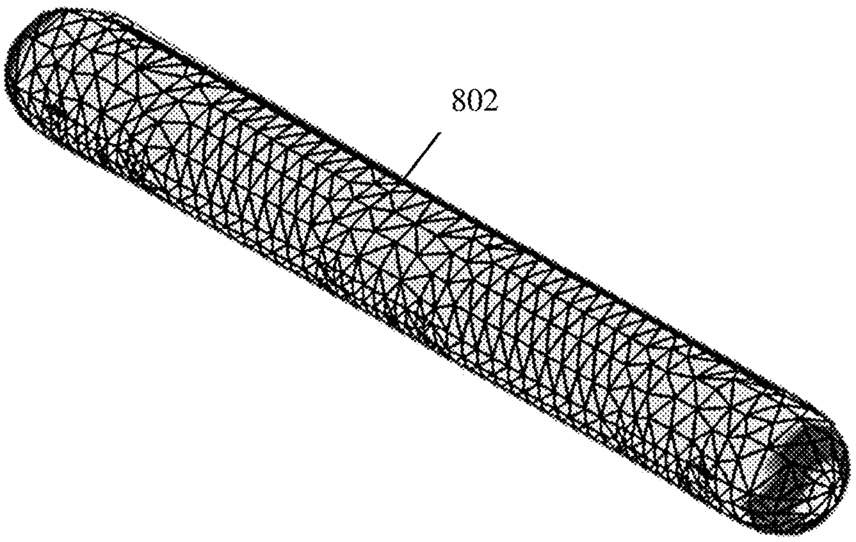
FIG. 8 is a model result of a pressurized element used as a control study.

FIG. 8 is a model result of a pressurized element 802 used as a control study for FET. The pressurized element 802 is similar to the pressurized elements 702. Baseline forces are applied in the model to the pressurized element 802 under a 5 MPa (50 bar) load without the pressurized element 802 assembled with other components, such as the shell 703 or bearing 701 of FIG. 7. Because there are no external forces, the loads on the pressurized element 802 are evenly distributed, as shown by the absence of dark areas on the pressurized element 802.

Example 1

Figure 9A:
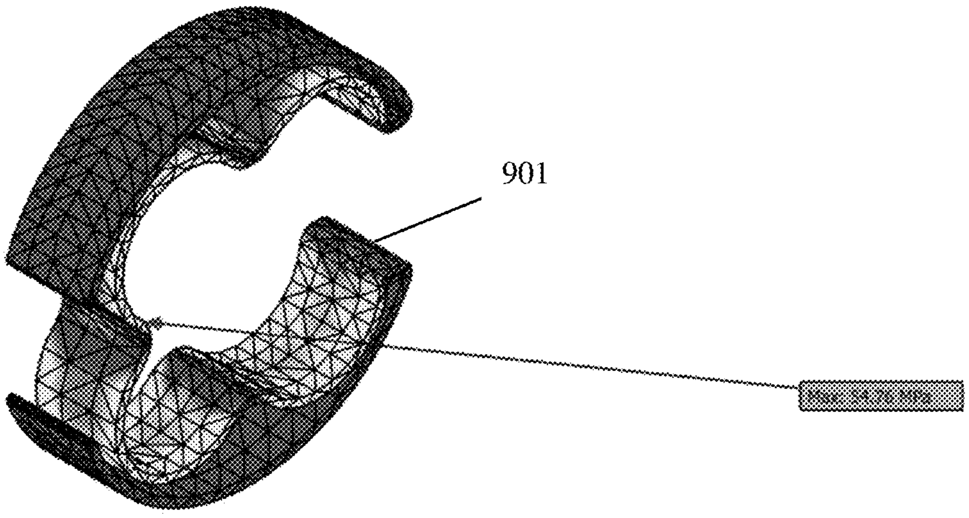
FIG. 9A is a model result of a bearing with a rigid connection to pressurized elements.
Figure 9B:
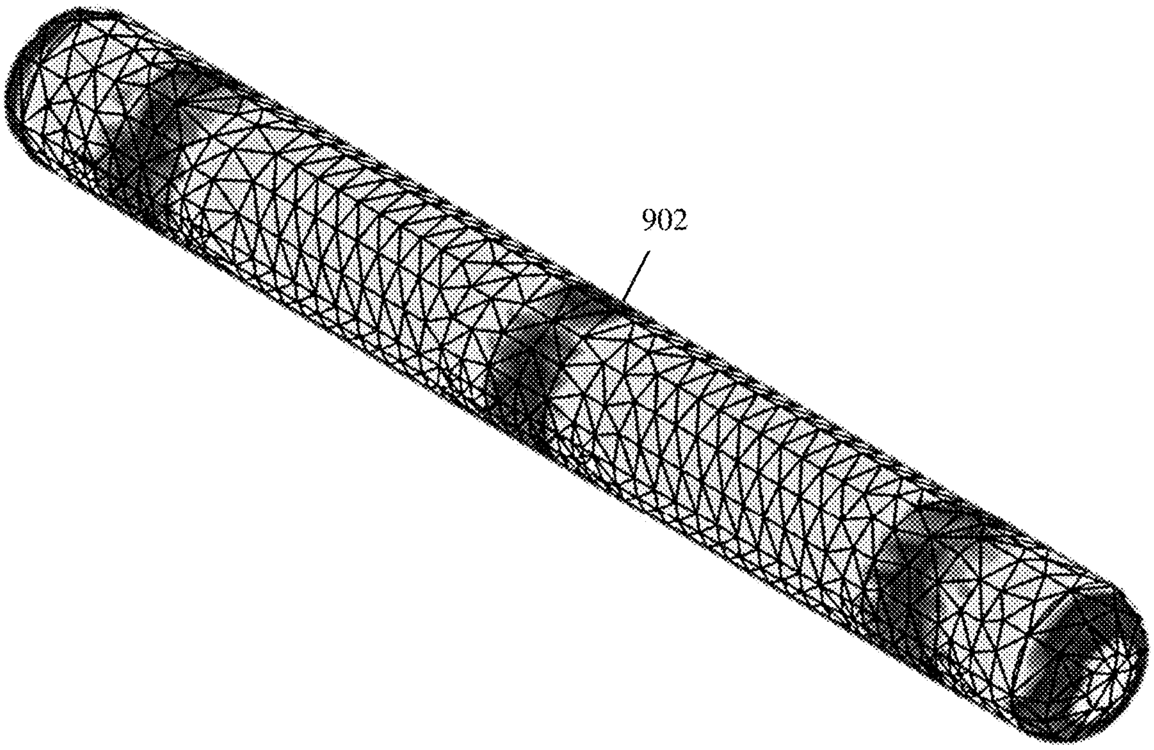
FIG. 9B is a model result of a pressurized element used with the bearing of FIG. 9A.

FIGS. 9A-9B show model results of a bearing 901 that is solid with a rigid connection to a pressurized element 902. The assembly of the bearing 901 and the pressurized element 902 is similar to the configuration of FIG. 7. The connection between the bearing 901 and the pressurized element 902 is fixed so the bearing 901 does not slide back and forth along the longitudinal axis of the pressurized element 902. The pressurized element 902 has a 5 MPA load applied, and the bearing 901 has sharp loads distributed to points of contact on an internal surface of the bearing 901 that contacts the pressurized element 902. As shown in FIG. 9A, the load distribution to the bearing 901 at specific points can be as high as 54.76 MPa, where pressure loads have been transmitted to the bearing 901. Areas of high stress due to uneven loading of are seen where three bearings similar to the bearing 901 have been attached at dark portions of the pressurized element 902.

Example 2

Figure 10A:
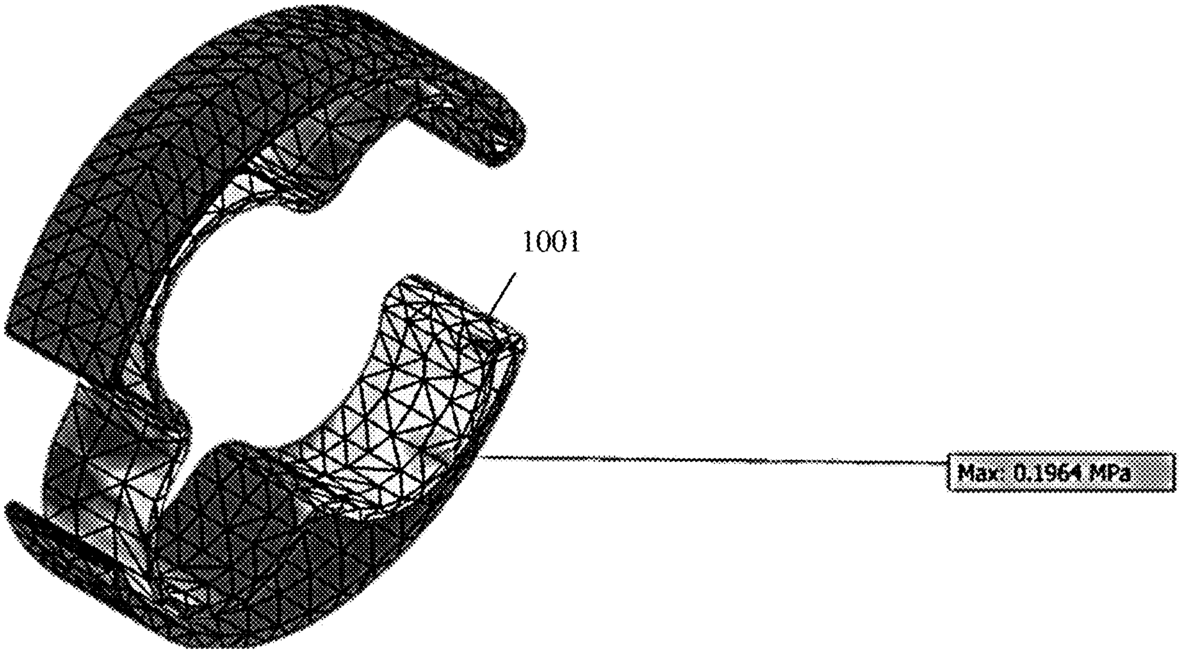
FIG. 10A is a model result of a bearing with a sliding connection with pressurized elements.
Figure 10B:
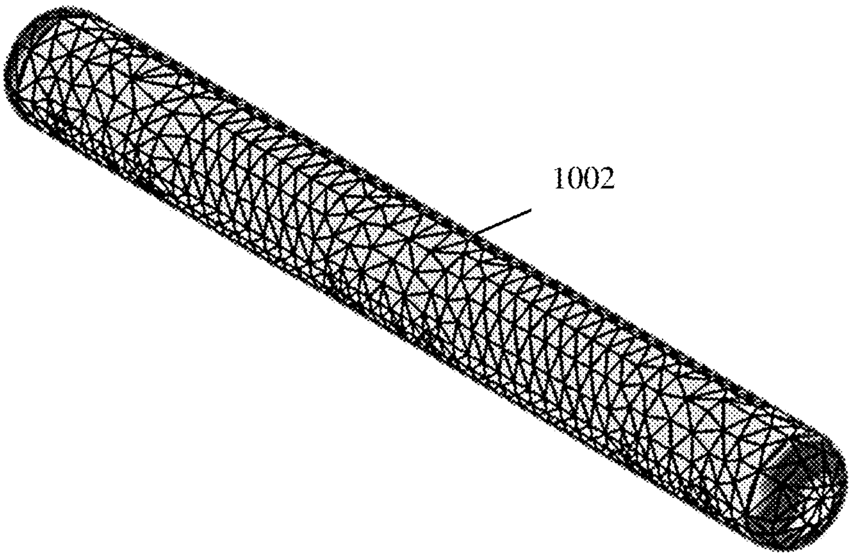
FIG. 10B is a model result of a pressurized element used with the bearing of FIG. 10A.

FIGS. 10A-10B are a model result of a bearing 1001 that is compliant with a sliding connection with a pressurized element 1002. The assembly of the bearing 1001 and the pressurized element 1002 is similar to the configuration of FIG. 7. A 5 MPa load is applied to the pressurized element 1002, and the bearing 1001 has a sliding connection with the pressurized element 1002 so that the bearing 1001 moves along the pressurized element 1002 and outer shell (not shown) and keeps pressure or load concentrations efficiently distributed. Because the bearing 1001 allows the pressurized element 1002 to fully support the pressure load, where it is more efficient to do so, the loads in the pressurized element 1002 are more evenly distributed. Additionally, by reducing the transfer of the pressure load to the bearing 1001, the structural loads are reduced, enabling the bearing 1001 to be smaller and lighter than the bearing 901 of FIGS. 9A-9B.

Example 3

Figure 11:
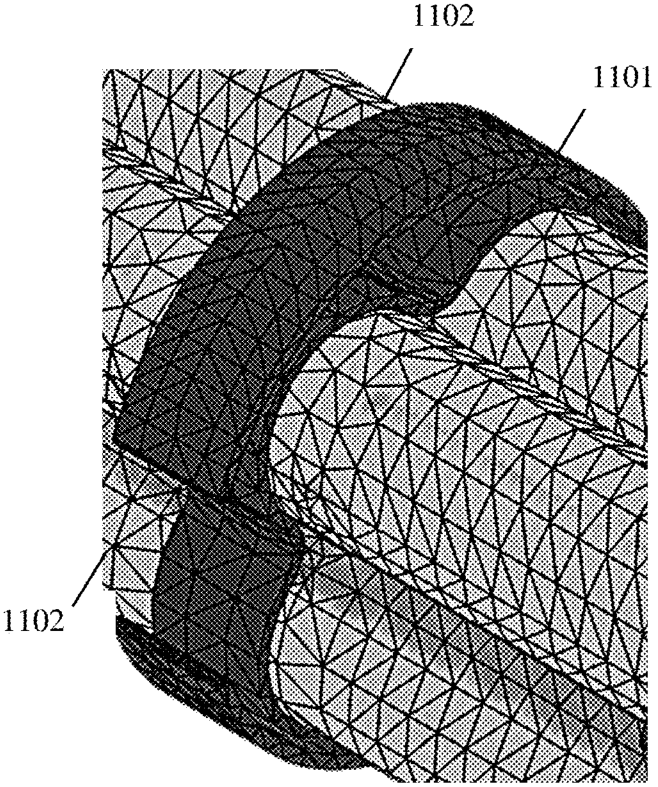
FIG. 11 is a model result of a bearing having a square edge and pressurized elements in sliding connection with the bearing.
Figure 12:
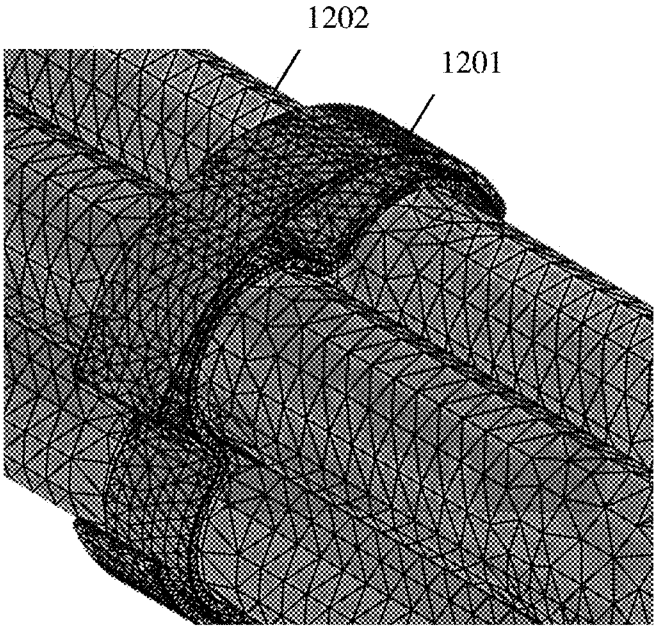
FIG. 12 is a model result of a bearing having rounded edges and pressurized elements in sliding connection with the bearing.

FIG. 11 is a model result of a bearing 1101 having square edges and pressurized elements 1102 in sliding connection with the bearing 1101. FIG. 12 is a model result of a bearing 1201 having rounded edges and pressurized elements 1202 in sliding connection with the bearing 1201. The respective assemblies of the bearings 1101, 1201 and the pressurized elements 1102, 1202 are similar to the configuration of FIG. 7. Without the rounded edges of the bearing 1201 of FIG. 12, binding occurs, as shown by concentrated dark shading on the bearing 1101 of FIG. 11, which is representative of increased localized stresses in the bearing 1101 and the pressurized elements 1102. With the rounded edges of the bearing 1201 of FIG. 12, the structural or pressure loads are reduced and more efficiently distributed between the pressurized elements 1202, the outer shell (not shown), and the bearing 1201.

Comparing Examples 1, 2, and 3, the bearings 1001, 1101, 1201 that slide in Examples 2 and 3 significantly reduce the uneven loading in the pressurized elements 1002, 1102, 1202 as compared to the pressurized element 902 and the bearing 901 in Example 1. Because the bearings 1001, 1101, 1201 that slide efficiently distribute the pressure or structural load transferred from the pressurized elements 1002, 1102, 1202, shells, pressurized elements, and bearings, such as the shell 703, the pressurized elements 702, and the bearing 701 of FIG. 7, can be composed of lighter materials that take up less space and weigh less. Bearings designed with softer or rounded edges, like the bearing 1201 of the FIG. 12, and materials can reduce structural loads imparted into the bearings 901, 1001, 1101, 1201 and the pressurized elements 902, 1002, 1102, 1201 caused by friction and binding between components.

Example 4

Figure 13A:
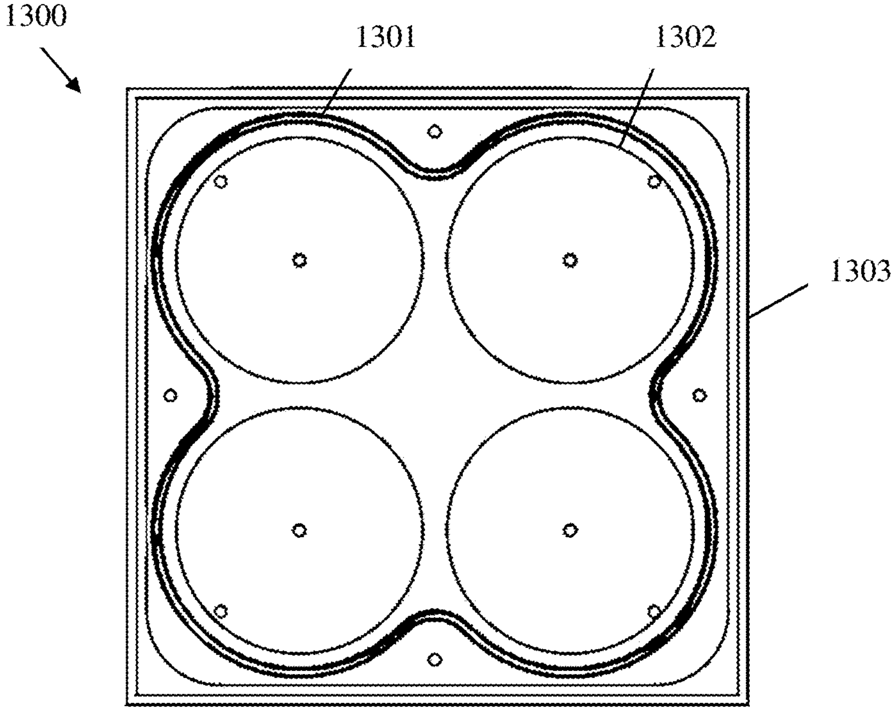
FIG. 13A is a pressure vessel having a square configuration.
Figure 13B:
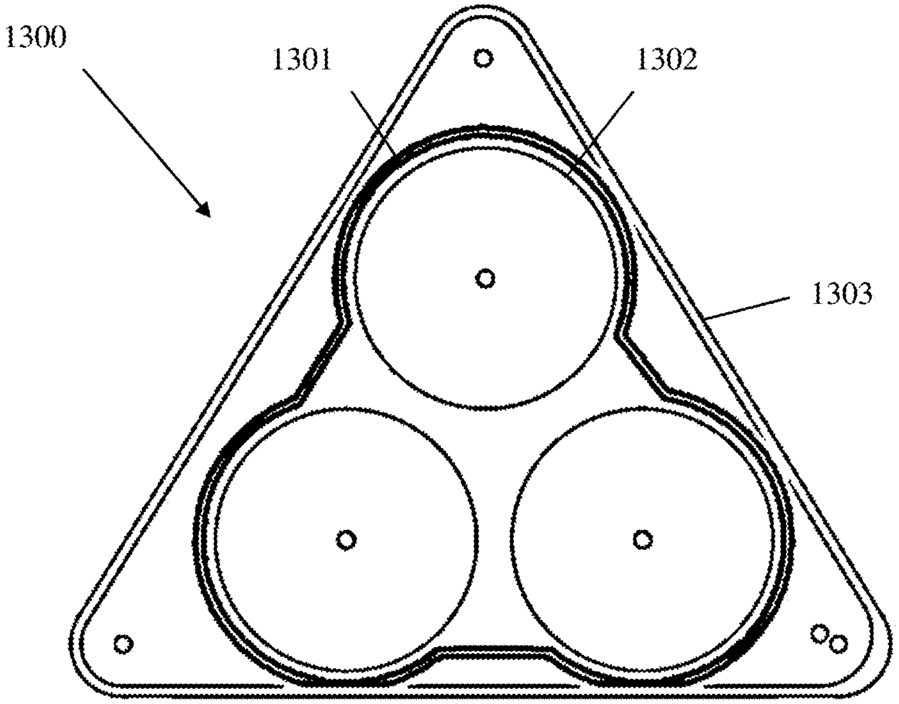
FIG. 13B is a pressure vessel having triangular configuration.
Figure 13C:
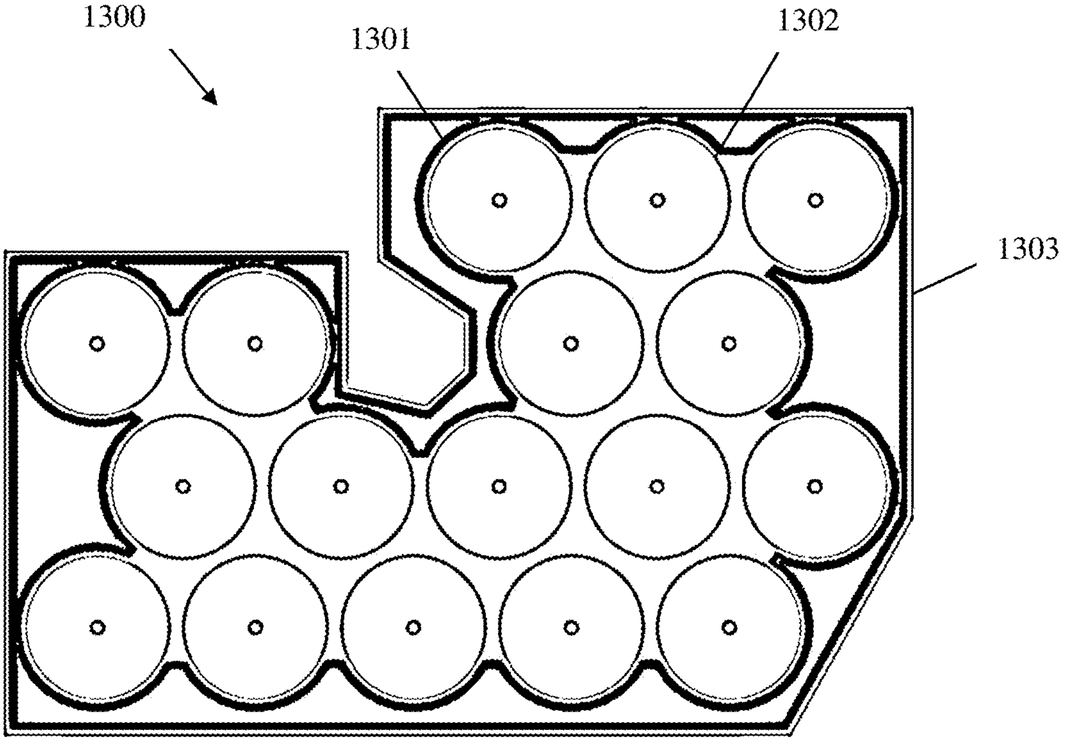
FIG. 13C is a pressure vessel having a complex configuration.

FIGS. 13A-13C show a pressure vessel 1300 having a square configuration (13A), triangular configuration (13B), or complex configuration (13C). These examples illustrate that bearings 1301 with different configurations (e.g., square, triangular, and complex) are compatible with pressurized elements 1302 and usable to distribute loads and secure the pressurized elements 1302 within the pressure vessel 1300 in a manner similar to the cylindrically shaped bearings 601, 701, 901, 1001, 1101, 1201 shown in FIGS. 6-12. Further, the number of the pressurized elements 1302 used with the bearings 1301 can vary widely. For example, between one to more than twenty pressurized elements 1302 may be used in the pressure vessel 1300. The combination of bearings 1301 and pressurized elements 1302 may also be housed in differing configurations of shells 1303, such as cylindrical, square, triangular, or complex configurations.

The previous examples are provided to illustrate the teachings herein but are not intended to limit the scope thereof. All parts and percentages are by weight unless otherwise indicated. While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A pressure vessel, comprising:

an outer shell that defines an enclosed cavity;

pressurized elements fluidly connected in series to form a contiguous chamber, disposed within the enclosed cavity of the outer shell, configured to contain a pressurized gas, and fluidly separated from the enclosed cavity; and a bearing system disposed between the pressurized elements and the outer shell, the bearing system comprising:

a flexible bearing structure connected to an interior surface of the outer shell and fixedly connected to an exterior surface of one or more of the pressurized elements; and one or more apertures configured to receive the pressurized elements and defined by the flexible bearing structure, wherein the bearing system is configured to flex to control movement of the pressurized elements in an axial direction and a radial direction with respect to the outer shell, wherein the flexible bearing structure surrounds each of the pressurized elements to secure the pressurized elements together so that sides of some of the pressurized elements are in contact with each other.

2. The pressure vessel of claim 1, wherein the flexible bearing structure includes:

an external surface that is shaped to conform to the interior surface of the outer shell; and an internal surface that is shaped to conform to the exterior surface of the pressurized elements.

3. The pressure vessel of claim 2, wherein:

the flexible bearing structure comprises a single elongated member that is folded to form the external surface and the internal surface of the flexible bearing structure; and the flexible bearing structure is configured to elastically deform such that the internal surface moves relative to the external surface.

4. The pressure vessel of claim 3, wherein the external surface of the flexible bearing structure surrounds the pressurized elements.

5. The pressure vessel of claim 1, wherein the flexible bearing structure comprises foam that is configured to elastically deform in accordance with expansion and contraction of the pressurized elements.

6. The pressure vessel of claim 1, wherein the flexible bearing structure resists movement of the pressurized elements with respect to the outer shell in the axial direction more than the flexible bearing structure resists movement of the pressurized elements in the radial direction.

7. The pressure vessel of claim 1, further comprising:

end fittings positioned on respective terminal ends of two of the pressurized elements; and valves connected with the pressurized elements at, the end fittings and configured to connect a pressurized gas source with the pressurized elements.

8. The pressure vessel of claim 1, wherein the outer shell comprises valves in fluid communication with the pressurized elements and configured to facilitate flow of pressurized gas between the pressurized elements and an external environment.

9. The pressure vessel of claim 1, wherein the outer shell has an interior surface that is smooth.

10. A pressure vessel, comprising:

pressurized elements that are fluidly connected with each other and configured to contain a pressurized gas;

a shell enclosing the pressurized elements, the shell configured to allow the pressurized elements to move with respect to the shell in an axial direction and a radial direction; and a bearing system securing the pressurized elements within the shell, the bearing system comprising:

a bearing component that extends along lateral sides of at least some of the pressurized elements, is disposed between the pressurized elements and the shell, and is shaped to form an exterior surface that abuts an interior surface of the shell and to form an interior surface that abuts exterior surfaces of at least some of the pressurized elements; and a peripheral opening defined on the exterior surface of the bearing component to control expansion and contraction of the pressurized elements in the radial direction by the bearing component expanding and contracting at the peripheral opening.

11. The pressure vessel of claim 10, wherein the exterior surface of the bearing component surrounds the pressurized elements except at the peripheral opening.

12. The pressure vessel of claim 10, wherein the bearing component comprises a flexible web-like structure that has a stiffness in the axial direction that is more than a stiffness in the radial direction.

13. The pressure vessel of claim 10, wherein the bearing system further comprises a rigid lattice-like structure that is configured to control expansion and contraction of the pressurized elements in the axial direction.

14. The pressure vessel of claim 10, wherein the bearing component includes filleted edges that are configured to reduce stress on the pressurized elements during expansion and contraction of the pressurized elements.

15. A pressure vessel, comprising:

an outer shell;

pressurized elements disposed within the outer shell, fluidly connected with each other, and configured to contain a pressurized gas; and one or more bearings comprising:

an outer peripheral surface that abuts an interior surface of the outer shell and that has an opening that allows the one or more bearings to flex as the pressurized elements expand and contract; and an inner surface that surrounds at least some of the pressurized elements to secure the pressurized elements together so that sides of some of the pressurized elements are in contact with each other, wherein the one or more bearings are:

disposed between the pressurized elements and the outer shell; and configured to allow movement of the pressurized elements with respect to the outer shell.

16. The pressure vessel of claim 15, wherein the inner surface of the one or more bearings is configured to slide against the pressurized elements in accordance with expansion and contraction of the pressurized elements.

17. The pressure vessel of claim 15, wherein each of the one or more bearings extend along the pressurized elements and terminate at edges to define an interface between the one or more bearings and the pressurized elements, and wherein the edges are radiused at the interface.

18. The pressure vessel of claim 15, wherein the outer peripheral surface of the one or more bearings is configured to slide against the interior surface of the outer shell in accordance with expansion and contraction of the pressurized elements.

19. The pressure vessel of claim 15, wherein the inner surface of the one or more bearings is fixedly connected to the pressurized elements.

* * * * *